United States Patent Office 2,805,178
Patented Sept. 3, 1957

2,805,178

WELDING FLUX COMPOSITION

Francis Emery Garriott, West Allis, Wis., assignor to Ampco Metal, Inc., Milwaukee, Wis., a corporation of Wisconsin No Drawing. Application April 20, 1953, Serial No. 349,941

10 Claims. (Cl. 148—26)

This invention relates to a welding flux composition and more particularly to a flux composition for use with copper-base alloys such as aluminum-bronzes and beryllium-coppers.

Difficulty has been encountered in the past in consistently securing a fully penetrated, good appearing, sound weld in bronze sheet and plate with the inert gas tungsten-arc process using bronze filler rods unless high preheat and interpass temperatures and abnormally high current densities were used in order to make the weld metal flow uniformly into the gap between the adjacent surfaces of the plates. However, such difficulties have been solved through the use of the flux composition of the present invention.

An object of the present invention is to provide a powdered flux which, when mixed with a vehicle such as alcohol, can be readily applied as a paste to the surfaces of the bronze articles to be welded and/or to a bronze filler rod, and will coat the articles or the filler rod as an adherent film on evaporation of the vehicle.

Another object is to provide a flux composition which may be readily applied in varying thicknesses to the surfaces of the bronze articles to be welded.

Another object of the invention is to provide a flux composition that will effectively cause the weld metal to flow smoothly and uniformly into the gap between the opposed edges of the bronze plates to be welded when using the inert-gas, metal-arc process by breaking up and removing the highly refractory oxides of aluminum, copper, etc. present on the plate and filler rod.

Another object of the invention is to provide a flux composition that will reduce the surface tension of the weld metal sufficiently to properly "wet" the opposed walls of the bronze plate to provide a uniform, sound weld deposit resulting in proper penetration.

Another object of the invention is to provide a flux composition which will adequately remove the oxides of copper, iron, aluminum, etc. which are formed during the welding operation from the molten weld metal thereby producing a sound deposit.

Another object is to provide a flux particularly adapted for use with inert-gas, metal-arc and oxy-acetylene welding.

Other objects and advantages of the invention will appear in the course of the following description.

This invention is based on the discovery that an improved flux composition can be attained by combining low melting point fluorides and fluoroborates. This flux can be readily applied in paste form by mixing with a volatile vehicle and applied to the bronze surfaces to be welded. Upon evaporation of the vehicle, the flux remains as an adherent film on the surface and functions to provide penetrating, sound and good appearing welds.

According to the invention, the flux composition is composed primarily of a mixture of low melting point fluorides and alkali metal fluoroborates with the possible addition of silico fluorides and chlorides of the alkali metals.

In general, the flux composition may contain the several ingredients in the following proportional ranges:

| | Parts by weight |
|---|---|
| Low melting point fluorides | 20–100 |
| Alkali metal fluoroborates | 5–20 |
| Alkali metal chlorides | 0–20 |
| Alkali metal silico fluorides | 0–20 |

The fluorides may take the form of alkali metal fluorides such as potassium fluoride and sodium fluoride, cryolite ($5NaF \cdot 3AlF_3$), and alkaline earth metal fluorides such as barium fluoride and lithium fluoride, or any other low melting point fluoride capable of producing a slag of generally low surface tension and viscosity. It is desirable to reduce the surface tension and viscosity of the slag so that the slag will readily spread over a greater area and penetrate into the joints between the plates having vertical side walls. The fluorides act to produce this desirable low surface tension and viscosity in the slag.

In addition, high percentages of sodium fluoride act to provide a flux coating that is readily removable when cold by wire brushing.

The fluoroborates may comprise any alkali metal fluoroborates such as sodium or potassium fluoroborate. The fluoroborates tend to produce a flux composition which will adhere well to the bronze article to which the flux is applied. The flux may be applied to the bronze or copper-base alloy filler rod, or to the adjacent opposed edges of two bronze plates, sheets or castings to be welded together, or to the surfaces of the bronze articles in the vicinity of the weld or deposit. Any combination of these methods of application may also be employed.

The fluoroborate acts to produce a mechanical adhesion between the flux and the surface to which the flux is applied. The powdered dry flux is preferably mixed with a sufficient amount of a vehicle capable of readily evaporating, such as alcohol, to form a paste, and the paste is then applied to the bronze surfaces in this form.

On evaporation of the alcohol, the flux will remain on the surfaces in the form of a tightly adhering coating due to the binding effect of the fluoroborates. This enables the flux to be applied to surfaces, such as the vertical opposed walls between plates, which ordinarily could not be adequately coated with flux.

The alkali metal chloride, such as sodium or potassium chloride, may be employed as a wetting agent to generally improve the flow characteristics of the flux. The chlorides also function to remove the oxides of aluminum, copper, iron etc. from the molten weld metal and thereby cleanse the metal during remelting and until solidification of the weld metal occurs.

The silico fluoride, such as sodium or potassium silico fluoride may be substituted for, or interchanged with the chlorides and similarly aids in adjusting the surface tension and viscosity of the flux and also serves to cleanse the weld metal by de-oxidation.

The exact composition of the flux may be varied depending on the specific copper-base alloy being welded, the composition of the filler rod and the welding process used in depositing the metal.

Specific examples of various flux compositions under the present invention are as follows:

|  | Parts by Weight | | | | | | |
|---|---|---|---|---|---|---|---|
| Sodium fluoride | 40 | 40 | 40 | 40 | ---- | 40 | 20 |
| Cryolite | 20 | 20 | 20 | ---- | 20 | 20 | 20 |
| Potassium fluoride | ---- | 10 | ---- | ---- | 10 | 10 | 5 |
| Lithium fluoride | ---- | ---- | ---- | 20 | 40 | ---- | ---- |
| Potassium fluoroborate | 10 | ---- | 10 | ---- | 10 | 5 | 20 |
| Sodium fluoroborate | ---- | 10 | ---- | 10 | ---- | 5 | ---- |
| Sodium chloride | 10 | ---- | ---- | ---- | ---- | 5 | ---- |
| Sodium Silico fluoride | ---- | ---- | 10 | ---- | ---- | ---- | ---- |

A desirable flux composition for application to aluminum-bronze filler rods for welding aluminum bronze sheets comprising, by weight, approximately 7% aluminum, 2.5% iron, .25% nickel and the balance copper, is as follows:

| | Parts by weight |
|---|---|
| Sodium fluoride | 60 |
| Cryolite | 20 |
| Sodium fluoroborate | 10 |
| Sodium chloride | 10 |

Various other fluxing agents in substantial amounts may be employed with those specified above so long as the desired characteristics described are not adversely affected.

The dry powdered ingredients are thoroughly mixed together, and a sufficient amount of a diluent vehicle capable of readily evaporating, such as alcohol, is added to the mixture to make a paste. The paste is then applied by brushing or any other convenient means to the adjacent edges of the bronze articles to be welded together. In addition the paste is applied to a narrow band on the top and bottom surface of the articles adjacent the joint therebetween to insure that all portions of the articles which are apt to melt during welding are adequately covered with the flux.

The bronze filler rods, if employed, may be coated as by dipping with the flux paste.

On evaporation of the alcohol or other vehicle, the flux remains on the bronze surfaces as an adherent film. The thickness of the flux film will depend on the particular welding operation to be employed.

The present flux composition is preferably employed with an inert-gas tungsten-arc welding welding process, an inert-gas consumable electrode process or oxy-acetylene welding. The flux may be readily applied to any bronze surface, and the slag resulting during welding is very fluid, enabling the same to spread over a large area and produce a weld deposit of smooth contour with a minimum of surface pitting and undercutting at the edges of the weld.

Various embodiments of the invention may be employed within the scope of the following claims.

I claim:

1. A welding flux composition for use in inert gas and oxy-acetylene welding of bronzes and adapted to be applied with a vehicle as a coating to the surfaces to be welded, consisting essentially of a mixture of from 20 to 100 parts by weight of metal fluorides selected from the group consisting of alkali metal fluorides, alkaline earth metal fluorides and cryolite and characterized by the ability to provide a slag of low viscosity and surface tension, and from 5 to 20 parts by weight of an alkali metal fluoroborate selected from the group consisting of sodium fluoroborate and potassium fluoroborate to provide the necessary adherence to enable the composition to be applied to said surfaces.

2. A welding flux composition for use in inert gas and oxy-acetylene welding of bronzes and adapted to be applied with a vehicle as a coating to the surfaces to be welded, consisting essentially of a mixture of from 20 to 100 parts by weight of metal fluorides selected from the group consisting of sodium fluoride, potassium fluoride, lithium fluoride, barium fluoride and cryolite and characterized by the ability to provide a slag of low viscosity and surface tension, from 5 to 20 parts by weight of an alkali metal fluoroborate selected from the group consisting of sodium fluoroborate and potassium fluoroborate to provide the necessary adherence to enable the composition to adhere to said surfaces, and an alkali metal chloride in an amount not exceeding 20 parts by weight to improve the flow characteristics of the composition.

3. A welding flux composition for use in inert gas and oxy-acetylene welding of bronzes and adapted to be applied with a vehicle as a coating to the surfaces to be welded, consisting essentially of a mixture of from 20 to 100 parts by weight of metal fluorides selected from the group consisting of alkali metal fluorides, alkaline earth metal fluorides and cryolite and characterized by the ability to provide a slag of low viscosity and surface tension, from 5 to 20 parts by weight of an alkali metal fluoroborate selected from the group consisting of sodium fluoroborate and potassium fluoroborate to provide the necessary adherence to enable the composition to adhere to said surfaces, an alkali metal chloride in an amount not exceeding 20 parts by weight, and an alkali metal silico fluoride in an amount not exceeding 20 parts by weight, said chloride and said silico fluoride serving to adjust the flow characteristics of the composition and to aid in removing the oxides from the molten metal.

4. A welding flux composition for use in inert gas and oxy-acetylene welding of bronzes and adapted to be applied with a vehicle as a coating to the surfaces to be welded, consisting essentially of about 20 to 100 parts by weight of a low melting point fluoride selected from the group consisting of sodium fluoride, potassium fluoride, lithium fluoride, barium fluoride and cryolite and characterized by the ability to provide a slag of low surface tension and viscosity, about 5 to 20 parts by weight of an alkali metal fluoroborate selected from the group consisting of sodium fluoroborate and potassium fluoroborate, up to about 20 parts by weight of an alkali metal chloride and up to about 20 parts by weight of an alkali metal silico fluoride.

5. A welding flux composition for use in inert gas and oxy-acetylene welding of bronzes and adapted to be applied with a vehicle as a coating to the surfaces to be welded, consisting essentially of about 60 parts by weight of sodium fluoride, about 20 parts by weight of cryolite, about 10 parts by weight of sodium fluoroborate and about 10 parts by weight of sodium chloride.

6. A welding flux composition for use in inert gas and oxy-acetylene welding of bronzes and adapted to be applied with a vehicle as a coating to the surfaces to be welded, consisting essentially of about 40 parts by weight of sodium fluoride, about 20 parts by weight of cryolite, about 10 parts by weight of potassium fluoroborate and about 10 parts by weight of sodium silico fluoride.

7. A welding flux composition for use in inert gas and oxy-acetylene welding of bronzes and adapted to be applied with a vehicle as a coating to the surfaces to be welded, consisting essentially of about 20 parts by weight of cryolite, about 10 parts by weight of potassium fluoride, about 40 parts by weight of lithium fluoride and about 10 parts by weight of potassium fluoroborate.

8. A welding flux composition for use in inert gas and oxy-acetylene welding of bronzes and adapted to be applied as a coating to the surfaces to be welded, consisting essentially of a mixture of from 20 to 100 parts by weight of metal fluorides selected from the group consisting of sodium fluoride, potassium fluoride, lithium fluoride, barium fluoride and cryolite and characterized by the ability to provide a slag of low viscosity and surface tension, from 5 to 20 parts by weight of an alkali metal fluoroborate selected from the group consisting of sodium fluoroborate and potassium fluoroborate to provide the necessary adherence to enable the composition to be applied to said surfaces, and a sufficient amount of a vehicle to provide the composition with a paste-like consistency, said vehicle being capable of evaporating after said composition is applied to a bronze surface to permit said composition to remain on said surface as an adherent coating.

9. A welding flux composition for use in coating bronze articles to be welded and bronze filler rods, consisting essentially of from 20 to 100 parts by weight of a low melting point fluoride selected from the group consisting of alkali metal fluorides, alkaline earth metal fluorides and cryolite and characterized by the ability to provide a slag of low surface tension and viscosity, from 5 to 20 parts by weight of an alkali metal fluoroborate selected from the group consisting of sodium fluoroborate and potassium fluoroborate to provide the composition with adhesive properties, and a sufficient quantity of alcohol to provide the composition with a paste-like consistency and enable the composition to be readily applied to said bronze article and filler rod, said alcohol being adapted to evaporate after application of said composition to said article and rod to leave the composition on the article and the rod as an adherent film.

10. A welding flux composition for use in welding bronze articles, consisting essentially of from 20 to 100 parts by weight of a metal fluoride selected from the group consisting of sodium fluoride, potassium fluoride, lithium fluoride, barium fluoride and cryolite and characterized by the ability to provide a slag of low viscosity and surface tension, from 5 to 20 parts by weight of an alkali metal fluoroborate selected from the group consisting of sodium fluoroborate and potassium fluoroborate, an amount of a compound not exceeding about 20 parts by weight selected from the group consisting of alkali metal chlorides and alkali metal silico fluorides to provide the composition with proper flow characteristics, and a sufficient amount of a volatile vehicle to provide the composition with a paste-like consistency and enable the composition to be readily applied to said bronze articles.

References Cited in the file of this patent

UNITED STATES PATENTS

| | | |
|---|---|---|
| 1,981,798 | Bonsack | Nov. 20, 1934 |
| 2,174,551 | Cinamon et al. | Oct. 3, 1939 |
| 2,322,416 | Coleman et al. | June 22, 1943 |
| 2,452,995 | Cinamon | Nov. 2, 1948 |